US012810304B2

(12) United States Patent
Silcock et al.

(10) Patent No.: US 12,810,304 B2
(45) Date of Patent: Nov. 24, 2026

(54) METHOD AND APPARATUS FOR CONTROLLING CRM (CUSTOMER RELATIONSHIP MANAGEMENT) DATA WITH A GENERATIVE AI SYSTEM

(71) Applicant: PRICEWATERHOUSECOOPERS LLP, Toronto (CA)

(72) Inventors: Andrew Silcock, Toronto (CA); Urvi Maheshwari, Calgary (CA); Abhinav Ravi, Pickering (CA); Kwesi Apponsah, Newmarket (CA); Sean Zhang, Toronto (CA)

(73) Assignee: PRICEWATERHOUSECOOPERS LLP, Toronto (CA)

( * ) Notice: Subject to any disclaimer, the term of this patent is extended or adjusted under 35 U.S.C. 154(b) by 1 day.

(21) Appl. No.: 18/825,682

(22) Filed: Sep. 5, 2024

(65) Prior Publication Data

US 2025/0094999 A1 Mar. 20, 2025

(30) Foreign Application Priority Data

Sep. 8, 2023 (CA) ................................ CA 3212039

(51) Int. Cl.
*G06Q 30/015* (2023.01)
*G06N 3/0475* (2023.01)

(52) U.S. Cl.
CPC ......... *G06Q 30/015* (2023.01); *G06N 3/0475* (2023.01)

(58) Field of Classification Search
CPC ..... G06Q 30/015; G06Q 30/01; G06N 3/0475
See application file for complete search history.

(56) References Cited

U.S. PATENT DOCUMENTS

| | | | | |
|---|---|---|---|---|
| 9,092,802 | B1 * | 7/2015 | Akella | G06F 16/36 |
| 10,019,426 | B2 * | 7/2018 | Gao | G06F 40/169 |
| 2019/0327161 | A1 * | 10/2019 | Cannell | G16H 40/20 |
| 2020/0153964 | A1 * | 5/2020 | Copeland | G06N 5/046 |
| 2022/0391420 | A1 * | 12/2022 | Quatro | G06F 16/254 |

(Continued)

OTHER PUBLICATIONS

Newstex Blogs, "15 important data terms you should know," Crypto Breaking News, Newstex LLC, May 24, 2023.*

(Continued)

*Primary Examiner* — Nathan Erb
(74) *Attorney, Agent, or Firm* — NORTON ROSE FULBRIGHT CANADA LLP

(57) ABSTRACT

Methods and systems are designed to control CRM data by using a Generative AI system. This technology is relevant in the context of data input into CRM software applications, which are used by businesses to manage their customer interactions and data. The technology relates to computer-readable storage medium storing instructions, that when executed by a computer(s) configure the computer(s) to perform the steps of: (1) receive at an input of the computer(s), unstructured data; (2) output at an interface of the computer(s), a request to structure the unstructured data by a Generative AI system, wherein the request conveys a data schema that defines how the unstructured data is to be structured; and (3) receive from the interface structured data as a result of processing by the Generative AI system and storing the structured data in a CRM record maintained by the computer(s).

14 Claims, 15 Drawing Sheets

(56) References Cited

U.S. PATENT DOCUMENTS

| | | | | |
|---|---|---|---|---|
| 2024/0202225 | A1* | 6/2024 | Siebel | G06N 20/00 |
| 2024/0346036 | A1* | 10/2024 | Brown | G06F 16/3329 |
| 2024/0386214 | A1* | 11/2024 | Ghoche | G06Q 30/015 |

OTHER PUBLICATIONS

Salesforce, "Salesforce Announces Einstein GPT, the World's First Generative AI for CRM," press release, Mar. 7, 2023 (Mar. 7, 2023), available at: https://web.archive.org/web/20260101151935/https://www.salesforce.com/news/press-releases/2023/03/07/einstein-generative-ai/?bc=WA.

* cited by examiner

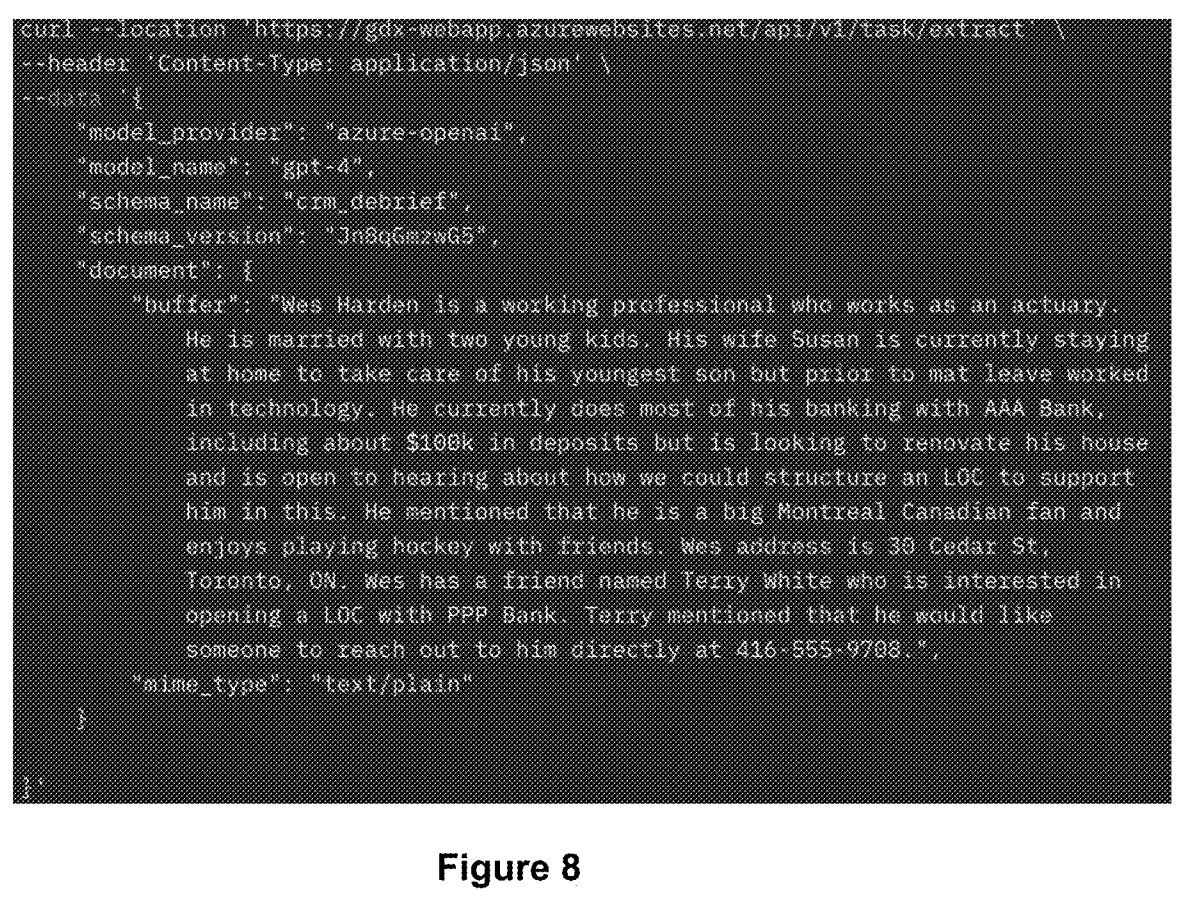

```
curl --location 'https://gdx-webapp.azurewebsites.net/api/v1/task/extract' \
--header 'Content-Type: application/json' \
--data '{
    "model_provider": "azure-openai",
    "model_name": "gpt-4",
    "schema_name": "crm_debrief",
    "schema_version": "Jn8qGmzwG5",
    "document": {
        "buffer": "Wes Harden is a working professional who works as an actuary.
            He is married with two young kids. His wife Susan is currently staying
            at home to take care of his youngest son but prior to mat leave worked
            in technology. He currently does most of his banking with AAA Bank,
            including about $100k in deposits but is looking to renovate his house
            and is open to hearing about how we could structure an LOC to support
            him in this. He mentioned that he is a big Montreal Canadian fan and
            enjoys playing hockey with friends. Wes address is 30 Cedar St,
            Toronto, ON. Wes has a friend named Terry White who is interested in
            opening a LOC with PPP Bank. Terry mentioned that he would like
            someone to reach out to him directly at 416-555-9708.",
        "mime_type": "text/plain"
    }

}'
```

Figure 8

METHOD AND APPARATUS FOR CONTROLLING CRM (CUSTOMER RELATIONSHIP MANAGEMENT) DATA WITH A GENERATIVE AI SYSTEM

CROSS-REFERENCE TO RELATED APPLICATIONS

This application claims the benefit and priority to Canadian Application No 3,212,039 filed on Sep. 8, 2023, the entire contents of which is hereby incorporated by reference.

TECHNICAL FIELD

The disclosure pertains to methods and systems designed to control CRM data by using a Generative AI system, such as a Generative AI system which implements a language model, such as a Large Language Model (LLM). This technology is relevant in the context of data input into CRM software applications, which are used by businesses to manage their customer interactions and data. For instance, the technology allows the conversion of unstructured data into structured data, which can then be employed to automatically populate specific fields within a CRM record. This process not only enhances accuracy but also improves operational efficiency by reducing manual data entry efforts.

Furthermore, this disclosure also relates to methods and systems for instructing a Generative AI system by using a data exchange format, such as a JSON, XML, YAML, among others.

BACKGROUND ART

Customer Relationship Management (CRM) software refers to a category of software solutions that help organizations manage interactions with current and potential customers. CRM software centralizes, simplifies, and automates customer relationship management processes, making it easier for businesses to organize, track, and foster their customer relationships.

A typical CRM solution is designed to perform one or more of the following functions, among others:

- Contact Management: Stores detailed information about each customer, including contact details, communication history, and even social media profiles. This ensures that businesses can view and manage details about their customers, making interactions more personalized and informed.
- Sales Force Automation: Tracks and manages sales processes, from lead generation to closing a deal. This includes setting reminders for follow-ups, tracking interactions, and predicting future sales.
- Marketing Automation: Helps businesses automate repetitive marketing tasks, such as sending out email campaigns to different segments of customers or tracking the effectiveness of various marketing strategies.
- Customer Service & Support: Provides tools to manage customer service requests, track issues, and automate certain support tasks. This ensures that customers receive timely support, and their feedback is properly channeled within the organization.
- Analytics & Reporting: Offers insights and reports on various metrics related to sales, customer service, and marketing efforts. This helps businesses make informed decisions and understand their customer base better.
- Integration: Most CRM systems integrate with other business tools and platforms, such as email services, social media platforms, and enterprise resource planning (ERP) systems. This ensures a seamless flow of data across various tools.
- Task and Calendar Management: Allows for the scheduling of appointments, calls, and meetings, and the setting of reminders, ensuring that important activities related to customer interactions aren't missed.
- Document Management: Some CRM systems also provide document storage, where sales or service documents can be stored and retrieved easily.

CRM software tools are designed to work primarily with structured data, which refers to information organized in a predefined manner that computers can process effectively. Data organized in rows and columns is an example of structured format, with each row representing a record and each column representing a specific attribute of that record.

When data is input into the CRM software application it should conform to the structure that the CRM system can handle. However, various situations arise where data collected is unstructured, meaning it lacks a predefined organization. Advisor notes, which are typically free-form text, are examples of unstructured data. While a CRM record can record advisor notes, it is difficult to leverage and use the advisor notes to their full potential unless a human structures the unstructured data, which is labor intensive and in practice is rarely done.

For instance, consider a scenario where a sales representative engages in a conversation with a potential client to discuss the products or services offered by the business organization. During the discussion, the potential client may provide relevant information about their financial, family, or social situation, among other things. This information is useful for building an accurate client profile, tailoring services or product offerings, and ultimately enhancing the customer experience.

However, the information gathered during such interactions is often in the form of unstructured text, such as advisor notes taken by the sales representative. Unstructured text cannot be directly input into the CRM system, requiring human intervention to convert it into a structured format that the CRM software application can understand. This responsibility typically falls on the sales representative or someone else involved in the data management process.

The challenge lies in ensuring that this conversion process is carried out diligently. In some cases, the conversion may not be done at all, resulting in valuable client-related information being overlooked or lost. Even when the conversion is done, it may be done superficially, leading to only partial capture of the relevant data in the CRM system.

Consequently, there exists a demand in the industry for automated tools that can extract information from unstructured data and convert it into a structured format.

SUMMARY

As embodied and broadly described herein, the invention provides a non-transitory computer-readable storage medium storing instructions, that when executed by one or more computers configures the one or more computers to perform the steps of:

a) receive at an input of the one or more computers, unstructured data;

b) output at an interface of the one or more computers, a request to structure the unstructured data by a Generative AI system, wherein the request conveys a data schema that defines how the unstructured data is to be structured;

c) receive from the interface structured data as a result of processing by the Generative AI system and storing the structured data in a CRM record maintained by the one or more computers.

A Generative AI system, also known as a Generative model, is a type of artificial intelligence that is designed to generate new data samples that resemble a given dataset. It is a class of AI models capable of learning the underlying patterns and structures of the training data and then using that knowledge to produce new, synthetic data that resembles the original data distribution.

In a specific and non-limiting example of implementation, the unstructured data is text data, however, the unstructured data can also be images, audio, or other data modality. The request submitted at the interface to structure the unstructured data conveys the data schema which acts as a blueprint for how the unstructured data is to be organized. For instance, the data schema identifies one or more keys. The Generative AI system which receives the request analyzes the unstructured data and the provided keys, extracting values from the unstructured data that correspond to each key. The data schema also includes mappings for placeholders, where the extracted values will be stored in association with their respective keys. This ensures that the Generative AI system correctly assigns the extracted values to the appropriate placeholders linked to each key.

As embodied and broadly described herein, the invention further provides a non-transitory computer-readable storage medium storing a data entity conveying a prompt configured to guide a generation process of the Generative AI system toward performing a task, wherein the data entity adheres to a data interchange format defining a plurality of key/value combinations.

In a specific example of implementation, the data exchange format acts as a framework to coordinate the diverse data elements in both the prompt directed to the Generative AI system and its subsequent output. This framework not only links the various data elements from the prompt to those in the output but also makes it easier for generic computing systems and platforms to meaningfully interpret the data produced by the Generative AI system. Within this framework, key-value pairs serve as placeholders: keys for the data elements of the prompt and corresponding values for the output data elements. As a result, general-purpose computing platforms, such as CRM software, can discern the relationships between these keys and values, specifically identifying which key corresponds to which value.

JSON is a specific and non-limiting example of a data exchange format. JSON is a lightweight and versatile data-interchange format, making it a good choice for various applications. JSON, being both human-readable and machine-readable, allows for efficient data exchange between different computer systems and platforms. Its simplicity and flexibility make it popular in web development, APIs (Application Programming Interfaces), configuration files, and data storage.

One advantage of using JSON as a prompt transmission platform lies in its structured nature, enabling the representation of complex data hierarchies. Moreover, JSON supports arrays, which permit the storage of multiple related elements under a single key, providing a compact and efficient way to handle collections of data.

In a possible variant, other data exchange formats can be considered, such as XML and YAML.

As embodied and broadly described herein, the invention also provides a non-transitory computer-readable storage medium storing instructions, that when executed by one or more computers configures the one or more computers to perform the steps of:

a. receive at an interface of the one or more computers, data output by a Generative AI system, wherein the data is structured according to a data schema defining key/value combinations;
b. implement at the one or more computers a Graphical User Interface (GUI) displaying to a user keys and respective values generated by the Generative AI system, wherein the GUI includes a validation control allowing the user to validate the key/value combinations;
c. in response to user input at the validation control indicating that one or more key/value combinations are valid, modifying a record maintained by a CRM application executed by the one or more computers to store the values in the record.

In a specific and non-limiting example of implementation, the keys are derived from the record.

In a specific and non-limiting example of implementation the validation control allows the user to validate individual ones of the key/value combinations.

As embodied and broadly described herein, the invention further provides a non-transitory computer-readable storage medium storing instructions, that when executed by one or more computers configures the one or more computers to perform the steps of:

a. receiving at a network interface of a computer system a response generated by a Generative AI system, wherein the response is compliant with a data exchange format;
b. processing the response to extract data from the response;
c. store the data in a record maintained by the computer system.

In a specific and non-limiting example of implementation, the data exchange format is JSON, and the response is also configured as JSON data. The JSON data includes JSON objects conveying respective key/value combinations.

As embodied and broadly described herein, the invention further provides a non-transitory computer-readable storage medium storing instructions, that when executed by one or more computers configures the one or more computers to perform the steps of:

a. receive at an interface of the one or more computers, data output by a Generative AI system, wherein the data is structured according to a data schema defining key/value combinations;
b. implement at the one or more computers a Graphical User Interface (GUI) displaying to a user keys and respective values generated by the Generative AI system, wherein the GUI includes a validation control allowing the user to validate the key/value combinations;
c. in response to user input at the validation control indicating that one or more key/value combinations are not valid, generating at the interface a request to the Generative AI system to generate different values for the respective one or more keys in the combinations identified as not being valid along with instructions indicating to the Generative AI system the one or more values that are not valid.

As embodied and broadly described herein, the invention yet provides a non-transitory computer-readable storage medium storing instructions, that when executed by one or more computers configures the one or more computers to perform the steps of:

a. receive at an interface of the one or more computers, data output by a Generative AI system, wherein the data is structured according to a data schema defining key/value combinations;
b. implement at the one or more computers a Graphical User Interface (GUI) displaying to a user keys and respective values generated by the Generative AI system, wherein the GUI includes a validation control allowing the user to validate the key/value combinations;
c. in response to user input at the validation control indicating that one or more key/value combinations are not valid, storing the one or more key/value combinations with an indication the one or more keys are not correct, for use as training data for the Generative AI system.

BRIEF DESCRIPTION OF THE DRAWINGS

FIG. 4 is a high-level depiction of a Graphical User Interface (GUI) presented to a user to obtain user input for validating the keys in a data schema used for the conversion of unstructured data in a structured format, while

FIG. 8 illustrates a JSON code snippet in which is embedded the unstructured data. From this data, a Generative AI system is expected to derive values corresponding to the provided keys.

DESCRIPTION OF AN EXAMPLE OF IMPLEMENTATION

Figure 1:
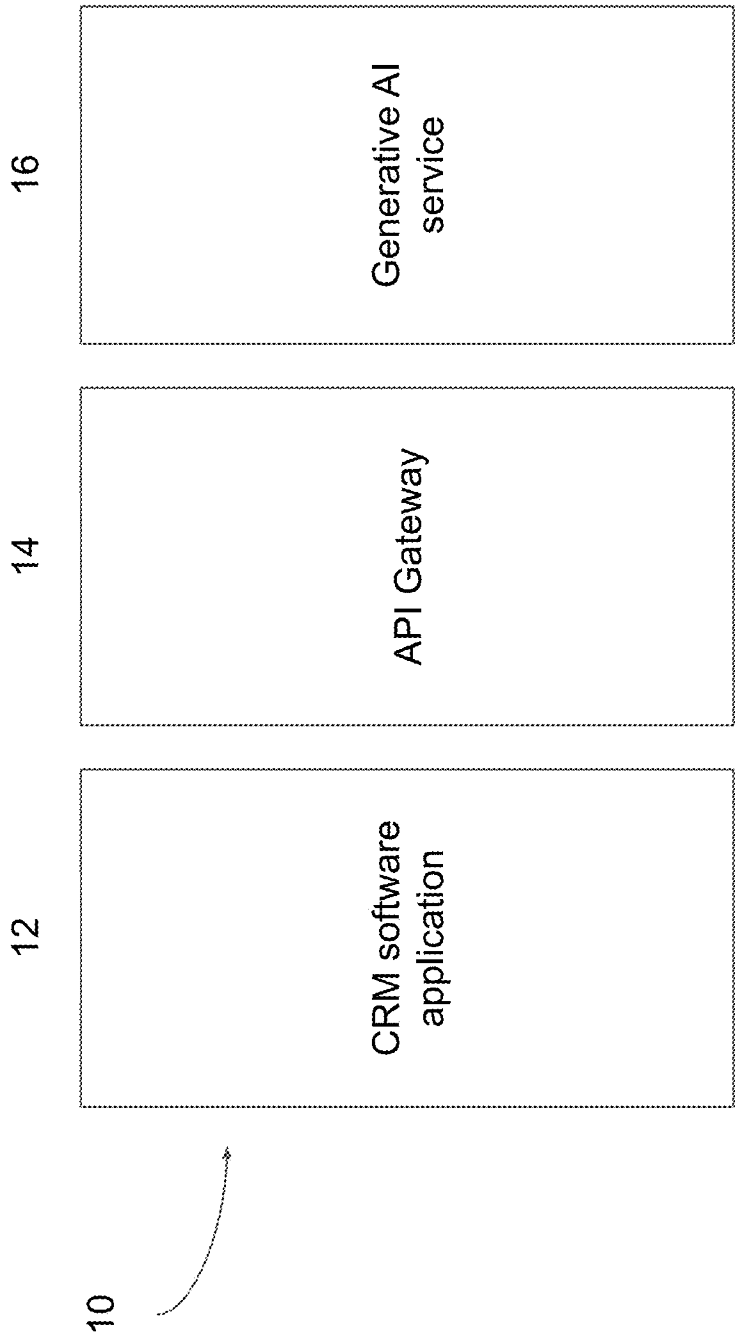
FIG. 1 is a block diagram which presents an overview of the computer and network architecture that employs a Generative AI system to transform unstructured data into a structured format.

FIG. 1 provides a high-level depiction of the system architecture that leverages a Generative AI system to convert unstructured data into structured data. This conversion process is applicable to various data modalities, including text, images, audio, or others. For this example, the description will focus on the conversion of unstructured text to structured text in the context of a Customer Relationship Management (CRM) software application, specifically designed to streamline data entry into business and client records.

In this specific scenario of a CRM software application, the conversion to structured text is desirable because it facilitates the data entry into the CRM system's records. These records can encompass both business records and client records or other kinds of records. When dealing with client records, the records can contain details about individual clients and their business dealings with the organization maintaining the CRM software application.

The system designated globally by 10, comprises a CRM software application 12, an API gateway service 14 and a Generative AI service 16, which in this example is powered by a Large Language Model (LLM).

The CRM software application 12 encompasses the software infrastructure responsible for the implementation of the CRM software application. This infrastructure can either be locally deployed or hosted in the cloud. The CRM software application 12 serves as a comprehensive platform, managing a multitude of records while offering various data-related functionalities. It is to be understood that while reference is made to a software infrastructure, the necessary computer hardware is also required to execute the software and implement the functionalities of the CRM software application 12. The hardware associated with the CRM software application 12 is not being discussed here in detail because it is an aspect known in the art.

These functionalities include client management, sales force automation, marketing automation, customer service and support, analytics and reporting, integration capabilities, task and calendar management, as well as document management, among other features.

The records stored within the CRM software application 12 are designed to hold client or business information. To ensure efficient processing, these records employ structured data, which follows a predefined format understood by the CRM software application 12. One example of a structured format is the organization of data in rows and columns, where each column represents a key, and each row represents a specific value corresponding to that key.

For instance, when dealing with client records, keys might include the client's name, address, telephone number, and more. This structured approach to data representation enables the CRM software application 12 to easily interpret and manage the information efficiently.

The API gateway service 14, functions as an intermediary linking the CRM software application 12 to the Generative AI service 16. Its primary role involves managing the flow of data between the CRM software application 12 and the Generative AI service 16.

When the CRM software application 12 sends requests, the API gateway service 14 receives them, and if necessary, performs pre-processing tasks before passing them on to the Generative AI service 16. Subsequently, the API gateway service 14 receives the results produced in response to the requests from the Generative AI service 16 and relays them back to the CRM software application 12.

The requests originating from the CRM software application 12 to the API gateway service 14 comprise two types: service requests and result requests. In the case of service requests, unstructured text is submitted, aiming to be converted into a structured format by the Generative AI service 16. On the other hand, result requests are made to retrieve structured text produced in response to previously submitted unstructured text.

By orchestrating this exchange of requests and responses, the API gateway service 14 streamlines the flow of information between the CRM application 12 and the Generative AI service 16. This integration allows the unstructured data from the CRM software application 12 to be effectively transformed into structured data, and the resultant structured data efficiently delivered back to the CRM software application 12 for further processing and utilization.

The Generative AI service 16 hosts a generative LLM model which receives the unstructured text along with keys and derives from the unstructured text values corresponding to the keys.

Figure 2:
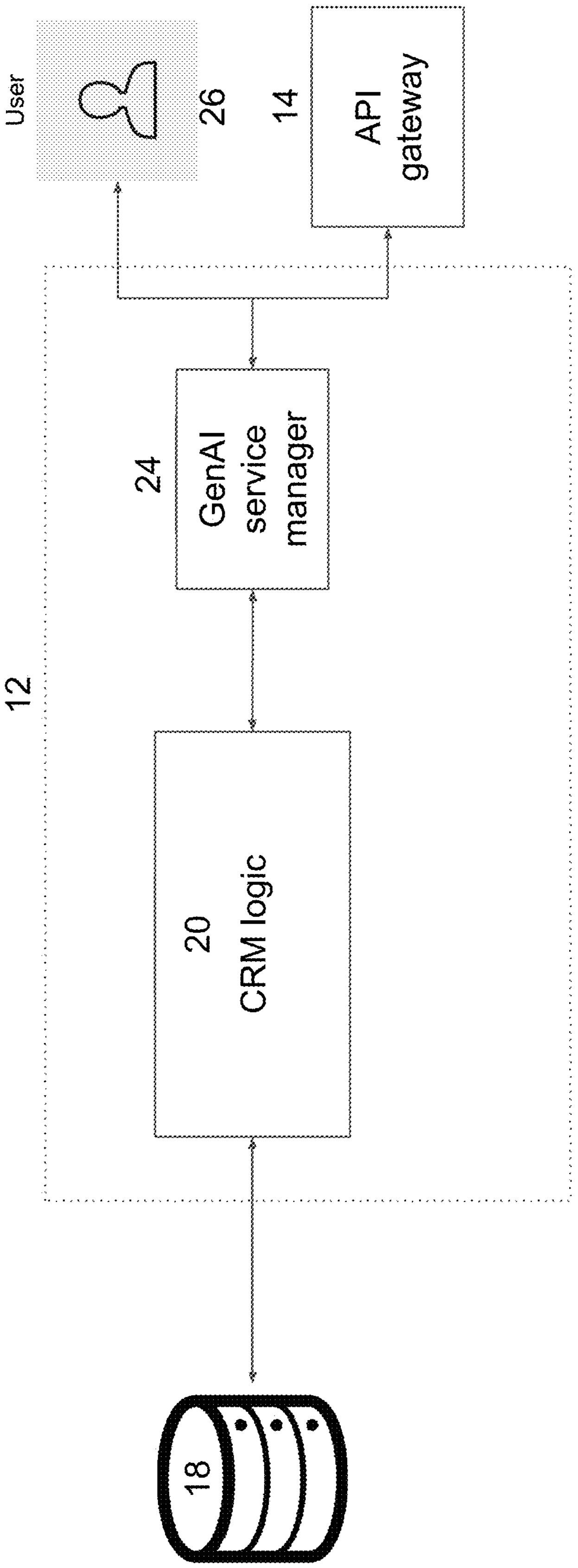
FIG. 2 is a more detailed block diagram of a CRM software application, highlighting the main software functionalities responsible for executing the conversion process of unstructured data into a structured format.

FIG. 2 is a more detailed block diagram of the CRM software application 12 illustrating the main functionalities for the conversion of unstructured text into a structured format.

The CRM software application 12 has a main functional block 20, denoted as CRM logic which generically refers to the traditional functions that the CRM software application 12 provides to users. Those include contact management, sales force automation, analytics, and reporting, etc.

In the context of the CRM software application 12, a data record or simply a record, refers to a collection of related information or data elements that are treated as a unit. Records are used to represent individual instances or entities within a dataset or database. The information stored in a record can be organized around the notion of keys, where each key holds specific pieces of information about the entity being represented. For example, in a customer database, each record would correspond to a specific customer, and the keys might include the customer's name, address, phone number, email, and purchase history. The CRM software application 12 stores the records in a storage device, such as a database, denoted as 18.

This database 18 can exist in two configurations: local or remote. In the local setup, the database 18 is hosted on the same servers that execute the CRM logic 20. This arrangement can offer efficient data access and processing, as the database 18 is in close proximity to the CRM software application's computational resources. Alternatively, in the remote setup, the database 18 is situated on separate servers, physically distant from the ones executing the CRM logic. These servers are interconnected via a network to facilitate data communication and management.

Although the diagram at FIG. 2 depicts database 18 as a single entity, it should be recognized that it can be designed in a distributed manner. This means that multiple data storage devices, located at various geographical locations, can be interconnected through networking protocols. In this distributed configuration, the individual storage devices work collaboratively to behave as a unified and cohesive data storage unit.

Similarly, the CRM software application 12 offers two implementation options: local and distributed. In the local implementation, the CRM software application's computer code runs on CPUs/GPUs hosted on servers physically situated near the user. This proximity allows for efficient and fast execution of the CRM software application 12, enhancing user experience and responsiveness. On the other hand, the distributed implementation involves executing different modules of the CRM software application 12 in remote locations, which are interconnected through a network. This distributed architecture enables the CRM software application 12 to leverage resources from multiple locations, facilitating scalability and load balancing for handling larger user bases and heavier workloads.

The CRM software application 12 includes a Generative AI service (GenAI service) manager 24. This manager is responsible for handling data processing and orchestrating various functions necessary for converting unstructured data into a structured format. Usually, the operation of the GenAI service manager 24 remains invisible to the user, occurring behind the scenes, with the exception of certain events visible by the user such as Graphical User Interfaces (GUI) as they relate to the conversion operation.

Generally, the GUI interface through which users can interact with the CRM software application 12 allows users to access, manipulate, and make informed decisions based on the information managed by the CRM software application. Such GUI interface enables the subsequent generic functions:

Data Visualization: The GUI interface allows users to view information residing in the records stored within the database 18. Users can access and examine relevant data presented in a user-friendly graphical format, making it easier to comprehend and analyze.

Processed Data Presentation: The GUI interface also displays information generated as a result of data processing or analysis carried out on the records stored in the database 18. This allows users to visualize insights, reports, or statistical summaries derived from the CRM software application's data.

Data Input and Modification: Users can input new data or modify existing information through the GUI interface. This input can be related to clients, business interactions, or any other details stored in the records of the CRM software application 12. Any newly entered or modified data is then saved in the corresponding records.

Command Execution: Users can direct the CRM application 12 to perform various functions on the records stored in the database 18 using the GUI interface. These commands may involve specific data operations, data retrieval, data updates, or other functionalities offered by the CRM system.

The GenAI service manager 24 interacts with the CRM logic 20 to create a user interface (GUI) on the user's display. This GUI offers functionalities tailored to converting unstructured data into a structured format. These functionalities are achieved through an array of visual elements or controls, designed to engage the user. The visual elements associated with the conversion function serve two primary purposes:

Displaying Information: The GUI visual elements present relevant information from the CRM software application 12 to the user. This could include data from records stored in the database or processed results such as reports, charts, or graphs.

Accepting User Input: Users can interact with the visual elements to provide data, such as entering new information related to clients or modifying existing records. Additionally, the visual elements can accept commands from the user, directing the CRM software application 12 to perform specific functions or operations on the data.

In a particular scenario, the GenAI service manager 24 creates a data schema that defines the desired structure for organizing the unstructured data. The GenAI service manager 24 also initiates API calls to the API gateway service 14 through a network interface, signaling a request to transform the unstructured data into a structured form using the capabilities of the Generative AI service 16.

Also, the GenAI service manager 24 requests structured data results from the API gateway service 14. Specifically, the GenAI service manager 24 generates a response request to the API gateway service 14, seeking the structured data results. This response will contain the data in the organized and structured format ready for utilization within the CRM application 12.

Figure 3:
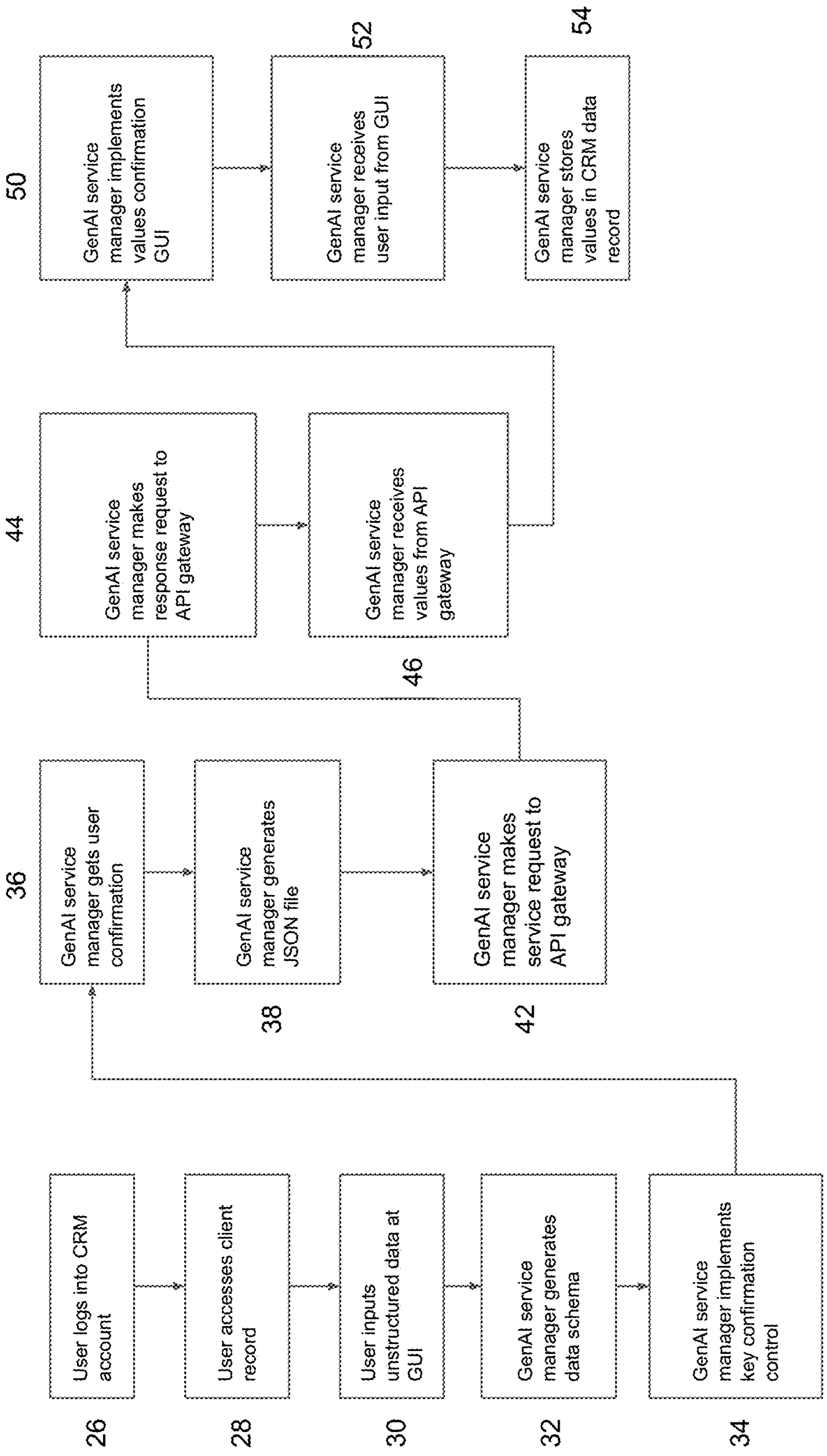
FIG. 3 is a flowchart of a process illustrating the steps performed during the conversion of unstructured data into structured format.

FIG. 3 is a flow-chart that illustrates in greater detail the functionality of the CRM software application 12 and in particular the functionality of the GenAI service manager 24.

At step 26 a user accesses the CRM software application 12 by submitting log-in credentials, such as a username and password. At step 28, the user accesses a particular data record, such as a client record. In that process, the user identifies the desired client record and the CRM logic 20 will fetch the desired record from the database 18 and display the record on the user display. Assume in this example, that the user is a sales representative, and the user is talking to a client on the phone while taking notes on an advisory notes section implemented at the GUI, as depicted by step 30 in the flowchart. The notes are as follows:

"John Doe is a working professional, and he works as an actuary. He is married with two young kids. His wife Susan is currently staying at home to take care of the youngest son but prior to mat leave, she worked in medicine. He is currently doing all his banking with Bank X, and he has roughly $100,000 in deposits. He wants to renovate his house and he wants to know how we can structure a line of credit to help him with the renovation. He also mentioned that he is a Toronto Maple Leaf fan and enjoys playing hockey with friends. His address is 1236 Cedar Avenue, Toronto, Ontario. John has a friend named Jimmy White who also might be interested in opening a line of credit with Bank X. John mentioned that he would like to have someone from Bank X reach out directly to him at his cell phone #432-568-1397."

After writing the advisory notes following the call with the client, the user triggers the conversion process, by actuating a control on the GUI, such as clicking a virtual button.

At step 32 the GenAI service manager 24 generates a data schema, which includes keys, that represent categories of information that will be used to structure the free-form text entered as advisory notes. In one example, the keys can be static; in other words they do not change from one set of advisory notes to another. That is to say, different sets of advisory notes are structured according to the same keys. In this example, the keys are stored at a preset memory location and the GenAI service manager 24 reads the keys from that memory location to generate the static data schema. For instance, the static keys can be specific to the user, and they can be stored in the user profile. The static keys may include the following: "name" and "telephone number". In that example, the data structuring operation would identify in the unstructured text the values associated only with the static keys and return those values.

In an alternate approach, the keys are dynamically generated. One way to achieve this is by extracting the keys from a data record of the CRM software application 12, such as the data record currently accessed by the user. In this scenario, the GenAI service manager 24 analyzes the content of the opened data record and identifies various categories of information present within it. These categories act as the keys that represent different aspects of the data which is needed for that particular record. In a simple example, when data in the record is organized as rows and columns, the keys could be the column headings.

Figure 4:
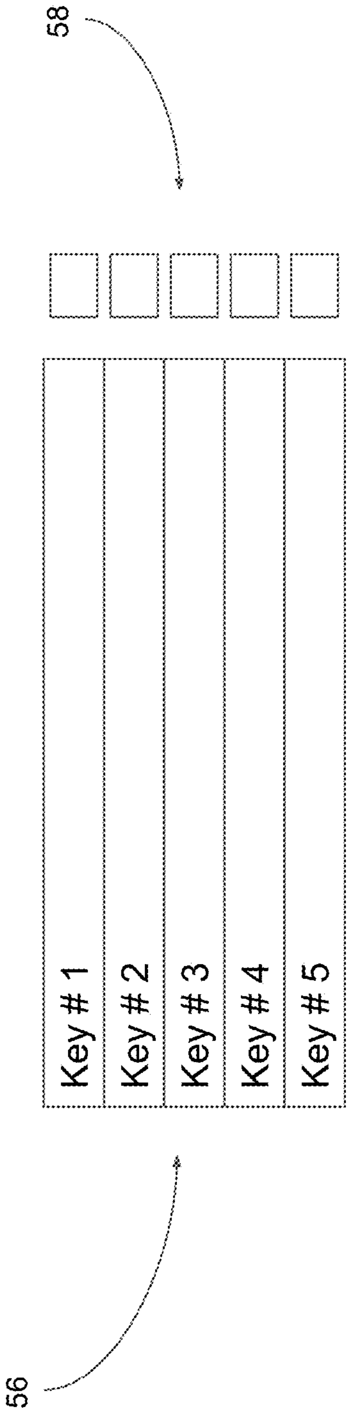

Optionally, at step 34, the GenAI service manager 24 produces a list of the extracted keys and presents it to the user for validation. FIG. 4 shows an illustrative GUI control designed for this purpose. The control depicts a list of the extracted keys at 56. 58 denotes a control with multiple selectable options, like checkboxes, enabling the user to individually choose and thereby individually validate keys based on two exemplary criteria: (1) accurate extraction from the CRM record and (2) relevance to the text structuring operation. Note that even if keys are accurately extracted from the CRM record, some might not be needed for the structuring operation, and thus, should be unchecked.

As it will be discussed below, keys function as components of a prompt for guiding the Generative AI service 16 to structure the free-form text. The manner in which these keys are articulated significantly affects the structuring of the text. Although a specific key phrase derived from a CRM record might work well at a basic level, the raw phrasing of the key might not be the most effective from a machine directive standpoint when higher levels of efficiency and accuracy are desired. Advantageously, the GUI control depicted in FIG. 4 is provided with editing features, allowing users to modify the individual keys displayed at 56. In this setting, the fields displaying the keys aren't fixed but are modifiable. Here, a user can modify a key for clarity, to elicit from the Generative AI service 16 a more accurate identification of correlating values in the free-form text. For instance, a key pulled from a CRM record could be an abbreviation or an acronym. When utilized as a component of a prompt, this short form might not best guide the Generative AI service 16 in identifying in the free-form text values related to the said abbreviation or acronym. In such cases, altering the key's phrasing can potentially enhance outcomes.

Figure 4A:
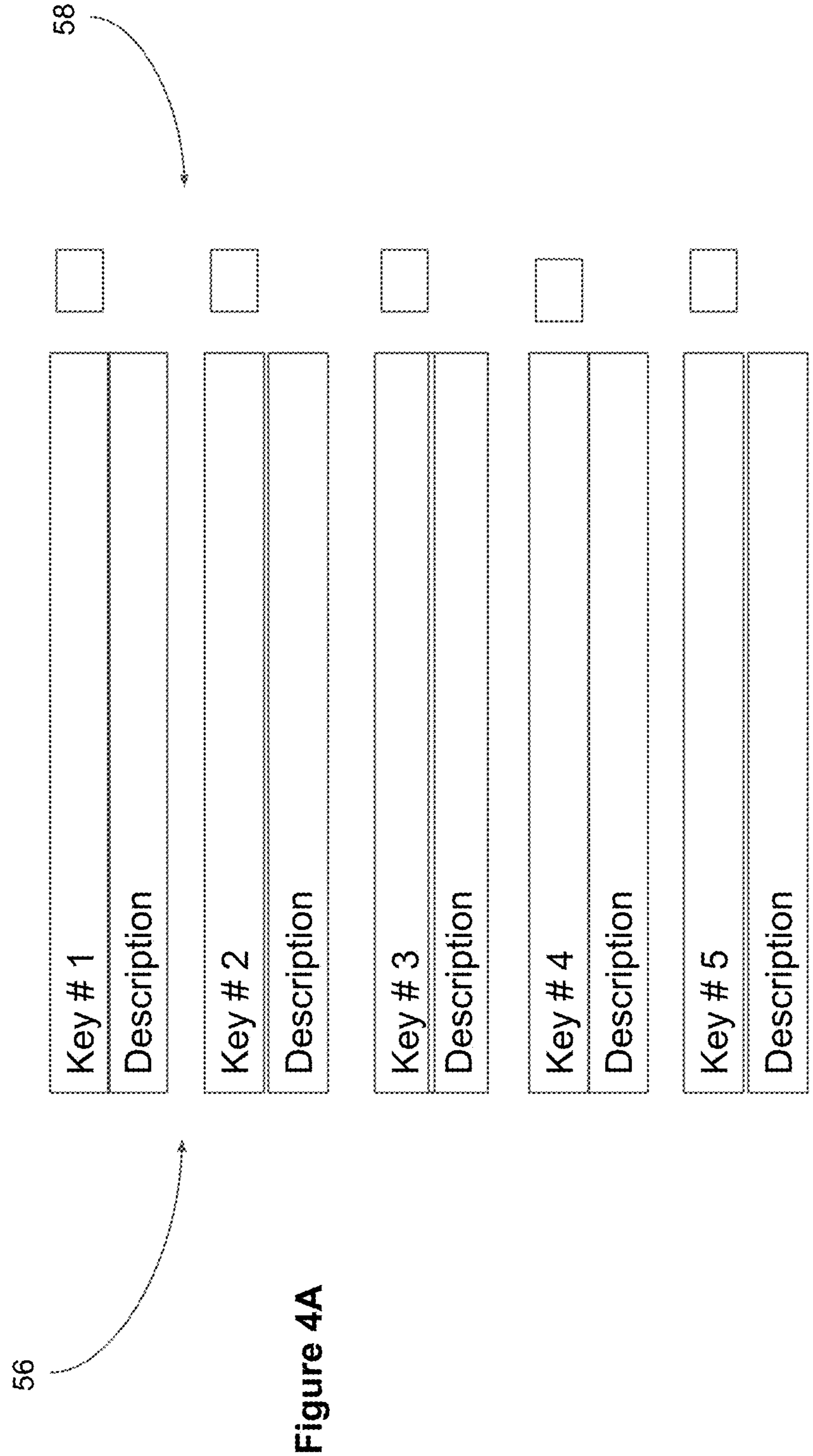
FIG. 4A shows the GUI of FIG. 4 with additional fields where the user can enter additional information to augment or otherwise condition the machine instructions in the key fields.

In a possible variant, the GUI control in FIG. 4 is provided with additional fields where the user can enter additional information to augment or otherwise condition the machine instructions in the key fields. The variant of this GUI control is shown at FIG. 4A. As is shown in FIG. 4A, each key field is associated with a description field in which the user can enter additional information, which works as additional prompt details to guide the Generative AI service 16 toward a better structuring of the free-form text. The data that can be entered into the designated description fields encompasses the following functional categories, among others:

Examples: Incorporating examples into a prompt for a language model, notably a comprehensive model like an LLM (Large Language Model), is a method to steer its responses. Through offering examples, users set a context, guiding the model towards the anticipated response. For instance, a key such as "Life events" might be too vague on its own and could benefit from added detail. Within this field, users can specify which life events they aim to log in the CRM record from the myriad of potential life events that can appear in the free-form text.

Format: Specify the structure in which the Generative AI service 16 will display the value discerned from the unstructured text. This ensures compatibility with the expected CRM record format, especially for entries like dates.

Output Constraints: Confine the values detected in the unstructured text to certain predefined categories. To illustrate, for the key "bank accounts," the output could be restricted to specific bank account categories: credit card, checking account, credit margin, and mortgage account. Thus, even if the unstructured text mentions an investment account, if it's not pertinent to the CRM record, excluding it from the description field ensures its omission from the Generative AI service's response.

In yet another alternative scenario, the GUI allows the key fields to remain blank, allowing the user to manually input the keys. In this case, the CRM record does not provide any key information, and it is up to the user to determine the relevant categories of information needed to organize the free-form text. The user then lists these desired categories in the GUI control to define the keys.

At step 36, the GenAI service manager 24 captures the user inputs from the GUI control 58 and from other user-modifiable fields. These inputs encompass the identification of the keys that will guide the conversion process, any modifications to the raw wording of keys, and the information provided in the corresponding description fields.

At step 38, the GenAI service manager 24 builds the data schema, which includes arranging the unstructured data, the keys, and optionally the descriptions in a data structure which adheres to a data interchange format. JSON is an example of a data interchange format, however other formats such as XML and YAML can also be considered, among others. The output from the GenAI service manager 24 is JSON data, from which a prompt can be derived by the Generative AI service 16. This prompt guides the Generative AI service 16 to identify values in the unstructured data that match the keys.

As it will be described in greater detail below, the various components of the prompt that the Generative AI service 16 will use to structure the unstructured data, namely the unstructured text and the key/value combinations are embedded in respective JSON objects. Specifically, the unstructured data is placed in a first JSON object, and each key is placed in a respective JSON object.

A prompt for a Language Learning Model (LLM) is a set of machine instructions expressed in natural language, such as a specific query or statement designed to elicit a particular response from the model. In essence, it serves as the input that guides the LLM to generate an output based on its training. The LLM interprets the prompt and responds with information or content that aligns with the intent behind the prompt.

Figure 5:
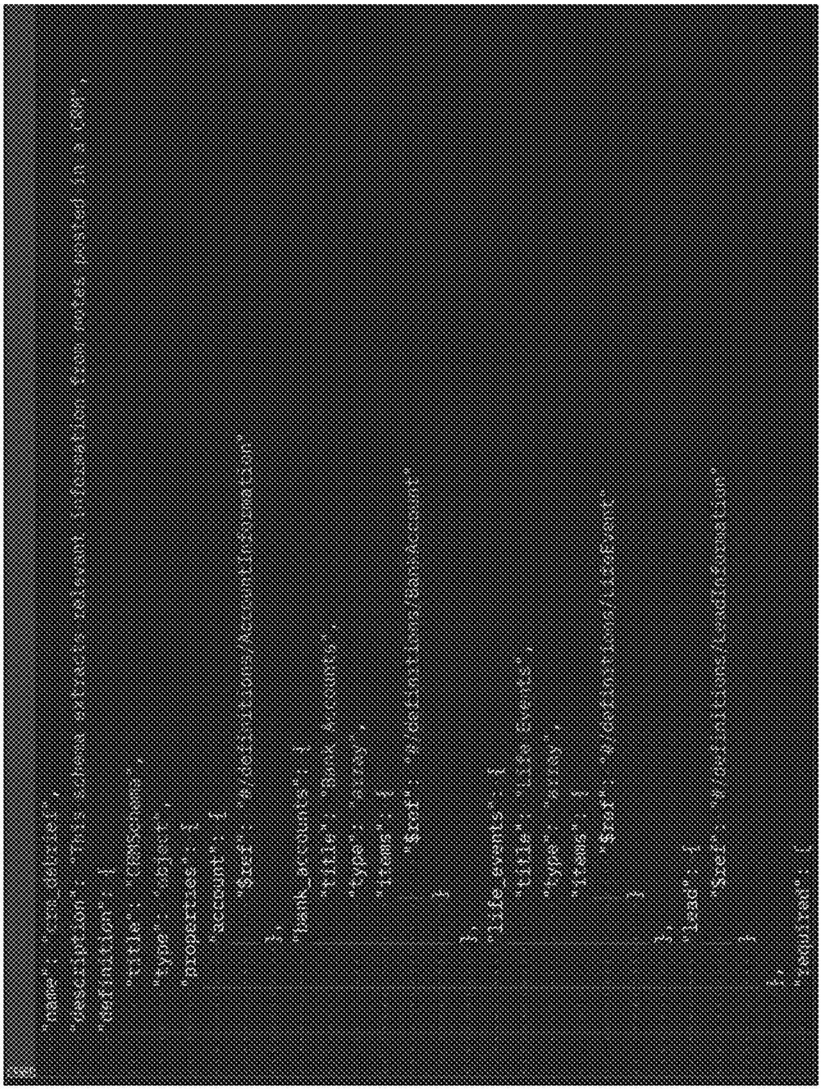
FIG. 5 illustrates a code snippet of a general schema definition prompt, according to a JSON format.

FIG. 5 is a code snippet illustrating a general schema definition prompt that adheres to the JSON format and that operates to instruct a Generative AI system to perform a certain task. The code listing in FIG. 5 identifies several keys and also provides placeholders for the values to be extracted from the unstructured text, which are associated with the respective keys. Examples of keys include "Bank accounts" which is defined as an array type JSON object with a placeholder to receive a list of values from the unstructured text that match the meaning of "Bank accounts". Another key is "Life events", also defined as an array type object, where values from the unstructured text that associate with "Life events" will be put.

The key's title field holds the name of the key, either in its raw form as extracted from the CRM record or as modified via the GUI shown at FIGS. 4 and 4A. The data placed in the title field is a component of the overall prompt and operates as machine instructions, guiding the Generative AI system to recognize values in the unstructured data correlating with the data in the title field. When the unstructured data is text, the content within the title field constitutes the machine instructions, leading the Generative AI system to generate outputs that match values in the unstructured text to the key's title. Notably, employing the title field of an object in the JSON data as a means to transmit machine instructions to a Generative AI system represents a new and advantageous aspect of the invention.

Figure 6:
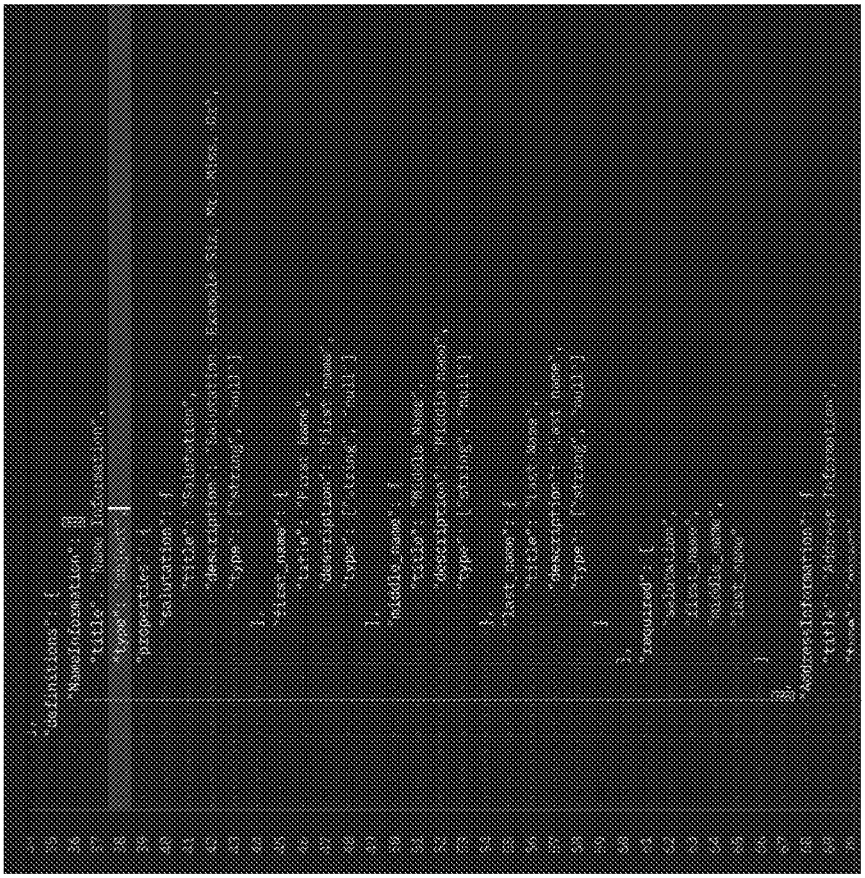
FIG. 6 illustrates a code snippet of a basic field definition prompt, according to a JSON format.

FIG. 6 shows a code snippet in JSON format, wherein the "description" field of a JSON object offers further direction to the Generative AI system for shaping its output. In one instance, this guidance pertains to the structure of the response produced by the AI system.

Typically, the description field within the JSON format serves to offer supplementary details regarding the data in the "title" field. Traditionally, this description field is intended for human understanding and isn't used to convey machine instructions. However, in this invention, the description field is repurposed to convey a second component of the overall prompt, which operates as machine commands, articulated in natural language, to a Generative AI system.

The GenAI service manager 24 receives the description inputs generated by the user via interaction through the GUI at FIG. 4A and places the description inputs in the respective description fields of the JSON data.

Figure 7:
FIG. 7 illustrates a code snippet of a nested field definition prompt with instructions, choices, and examples, according to a JSON format.

FIG. 7 is an example of a code snippet in the JSON format of a nested field definition prompt, listing instructions, choices, and examples. In the example of the code snippet, the description guides the Generative AI system to answer in the correct JSON format. For instance, the instructions specify the JSON "null" attribute to output, if no valid answer to the "lead interest" key exists in the unstructured text. Second, it constrains acceptable categories of responses to a specific number of categories, for example mortgage, borrowing, credit card, checking & savings account and wealth & investing.

FIG. 8 presents a code excerpt illustrating the incorporation of unstructured data into JSON data. The free-form text is represented using the key "text", with its corresponding value being the free-form text content. This approach, again, diverges from conventional JSON format practices. In this invention, the value linked to a key in the JSON data operates to supply the embedded background data on which the Generative AI system should operate. In this example, the embedded background data is the unstructured text in which the Generative AI system will look for values relating to the requested keys.

Referring back to the flowchart in FIG. 3, step 40 depicts the step where the GenAI service manager 24 outputs the JSON data. The schema definition contained within the JSON data is used to provide additional instructions and examples for the generative AI service. This data can be utilized to produce the prompt for the Generative AI service 16.

At step 42, the GenAI service manager 24 outputs the JSON data at a network interface and makes a service request to the API gateway service 14. The API gateway service 14 passes this request and the JSON data to the Generative AI service 16, which uses a Generative AI system in the background to service the request.

Figure 9:
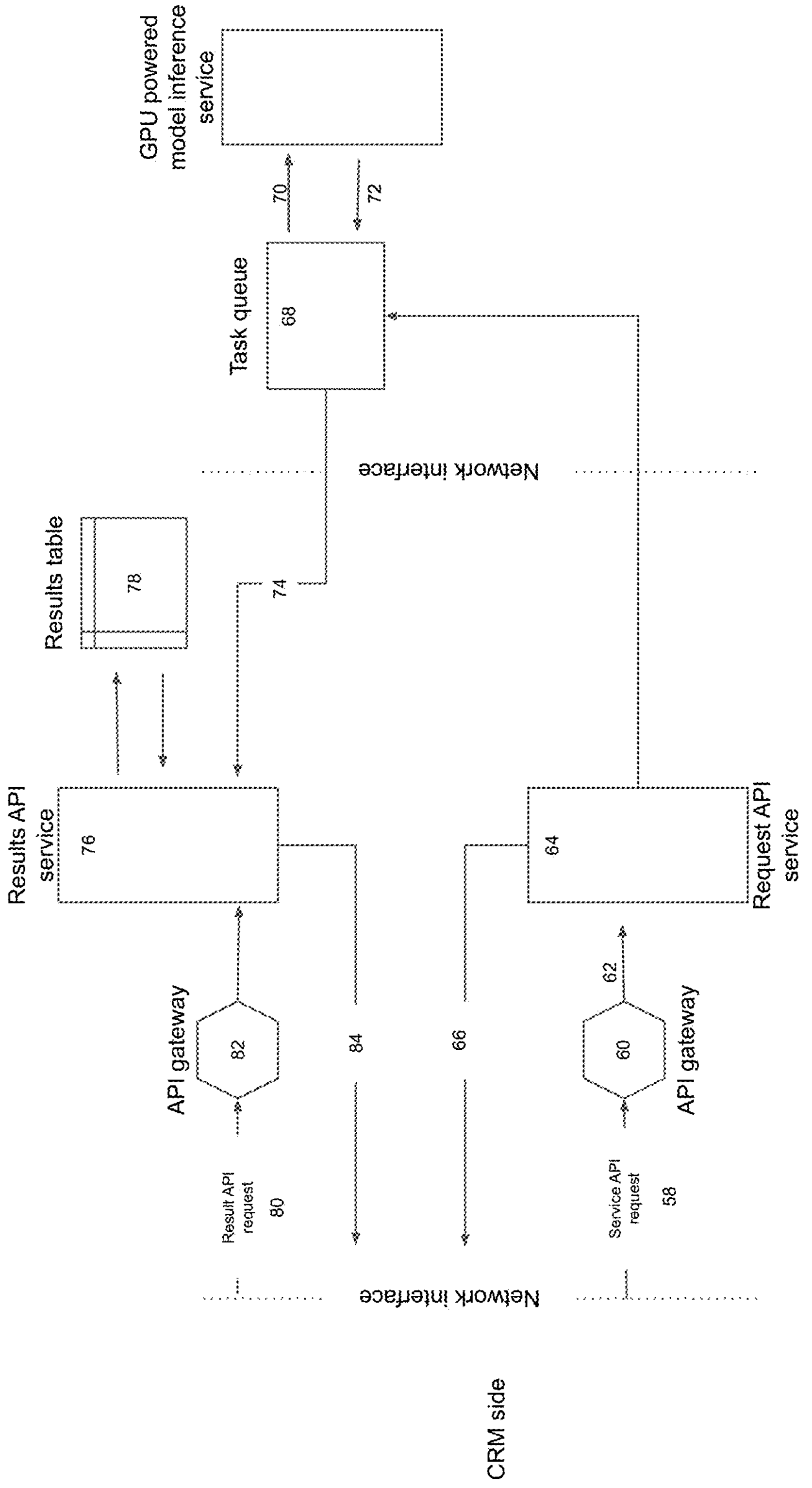
FIG. 9 is a block diagram illustrating the architecture of an API gateway to interface a computer system implementing a CRM software application and a Generative AI service.

FIG. 9 is a block diagram illustrating in greater detail the structure of the API gateway service 14 and the Generative AI service 16. Their architecture and functionality will be described in greater detail below.

The API gateway service 14 is connected to the network interface of the CRM software application 12. The network interface is shown by a dashed line at the left of the drawing establishing a boundary between the CRM software application 12 domain and API gateway service 14 domain. A second network interface is defined between the API gateway service 14 domain and the Generative AI service 16 domain. The second network interface is also shown by a dashed line, and it defines a boundary between the API gateway service 14 domain and the Generative AI service 16 domain.

The sequence in which the API calls unfolds is described with reference to FIG. 9. At step 58, the CRM software application 12 initiates a service API request to an API gateway 60. This request transmits the JSON data previously generated, conveying the unstructured data and the data schema. This schema enables the Generative AI service 16 to organize the unstructured data in line with the schema. Subsequently, the API gateway 60 forwards this submission 62 to a request API service block 64. As a response to this submission, the service block 64 returns an acknowledgement 66 to the CRM software application 12, informing it that the service request is in progress. Additionally, the service block 64 routes the service request to a task queue 68. This task queue 68 retains all tasks destined for the Generative AI service 16. The Generative AI service 16 handles task requests supplied from a variety of API endpoints, with the depicted CRM software application 12 being just one example of endpoint. The Generative AI service 16 processes these tasks at 70 in the order they arrive unless there's a specific task priority in place. Task execution encompasses delivering the JSON data to the chosen LLM model as a prompt. In a specific example an LLM model that has been tested and that has been found to work well in the context of the present invention is GPT-4 that is made available by OpenAI, an AI research and deployment company. However, other LLM models can be used without departing from the spirit of this invention.

At step 72, the LLM model produces results. These outcomes comprise the pairing between keys and their corresponding values derived from the unstructured data. The structure of this key/value pairing can differ, but in one instance, the results are also presented as JSON data. The output data mirrors the data model (i.e. schema definition) that was provided in the prompt JSON data that was created initially. The LLM model essentially returns a JSON output with the values it extracted from the unstructured text based on the instructions provided. Additionally, the JSON output from the LLM is validated against the defined schema to ensure that the data returned meets the schema specifications. The results transit through the task queue 68 and they are passed at 74 to a results API service block 76. The results API service block 76 receives the results and stores the results in a results table 78.

The CRM software application 12 is set up so that fetching the structured data necessitates a distinct API call. In other words, the API gateway service 14 retains the results until the CRM software application 12 specifically requests them. This approach offers the entire system some load balancing benefits, as results are dispatched on-demand rather than being preemptively pushed to the CRM software application 12, which might coincide with times when the application is ill-equipped to accept them.

To be more precise, when the CRM software application 12 requires the results, it initiates a results API request 80 directed to an API gateway 82, which is different from the API gateway 60. As highlighted earlier, an architecture with distinct channels for managing service requests and results requests proves beneficial, as it offers a strategy for enhanced load balancing. In this fashion the flow of service requests and results requests through the first network interface with the client computing system and the flow of service requests and responses through the second network interface with the Generative AI service 16 do not require synchronization and can be asynchronous.

The API gateway 82 passes the results request to the API service block 76 which searches the results table 78 for results and if results are available, they are sent to the CRM software application 12 at 84.

Referring back to FIG. 2, the GenAI service manager 24 processes the received results. It processes the JSON data obtained from the Generative AI service 16, extracting the key/value combinations, which are then relayed to the CRM logic 20 for storage in the corresponding CRM record. This procedure entails mapping the keys to the information categories within the CRM record (which originally produced the keys) and subsequently saving the associated values under their respective information categories in the record.

Figure 10:
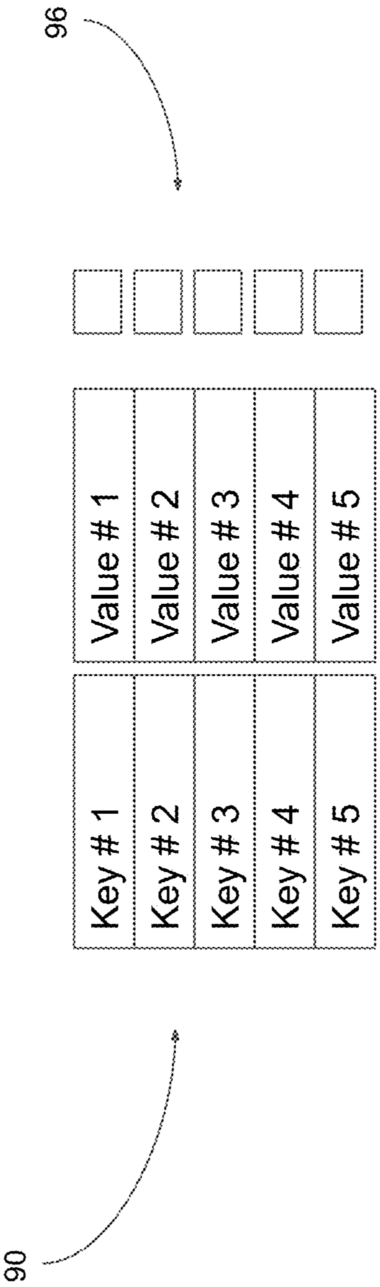
FIG. 10 is a general depiction of GUI showing a control allowing a user to validate the key/value combinations output by a Generative AI system before storage in a CRM record.

In a variant, the extracted values are first presented to the user for validation before storage in the CRM record. FIG. 10 is a high-level depiction of a dynamic GUI control implemented on the user display by the GenAI service manager 24, based on the key/values combinations.

The GUI features a control 90 that displays the keys at 92 and their corresponding values at 94. This control also incorporates a selection tool 96, like a checkbox, to approve the key/value pairings. In this instance, each key/value pairing can be validated separately through individual selections. The act of entering the values into the CRM record is initiated based on the user's action and pertains solely to the key/value combinations that have been validated via their specific selection tool.

It's worth noting that if an end user rejects a specific key/value pair through the Graphical User Interface (GUI), this feedback can be leveraged to enhance the training of the Language Learning Model (LLM) powering the Generative AI service 16 or trigger a new prompt with more specific guidance to avoid the incorrect response. If the LLM can be retrained, the incorrect response is used as training data during a re-training cycle of the LLM. If the LLM cannot be retrained, the rejected output can still be leveraged by indicating to the LLM that the response is incorrect and another response should be produced.

To implement the response re-generation option, a new prompt is produced—similar in most aspects to the original one—but with added instructions in one of the JSON objects, such as in the description field of the JSON object, to exclude the previously incorrect value for the specified key.

To elaborate, the GenAI service manager 24 receives the end user's feedback from the GUI. If any key/value pairs are rejected, the GenAI service manager 24 prompts the user with a dialog box, asking whether the Generative AI service 16 should regenerate its response.

If the user agrees, typically by clicking a button or another control interface on the GUI, the GenAI service manager 24 formulates a new prompt. This new prompt includes instructions to avoid generating the previously incorrect value. The prompt may be identical to the original prompt except for these additional instructions, or it may omit keys for which correct values were previously generated. In this case, the new prompt would convey the unstructured text along with the one or more keys associated with the incorrect values.

Following this, the process resumes as initially described: the revised prompt is sent to the Generative AI service 16, which then returns a new output featuring corrected values.

If the Language Learning Model (LLM) is capable of being retrained, the Generative AI service 16 can archive the prompt along with the key and incorrect response. This information can be used as training data and optionally combined with other sets of training data. Alternatively, the GenAI service manager 24 could store this information locally in a training data database. In this setup, a comprehensive training dataset is incrementally built and subsequently sent in batch form to the Generative AI service 16 for retraining the LLM. In this context, each time a user flags an incorrect value via the Graphical User Interface (GUI), the relevant information is added to the database, contributing to the assembly of the training dataset.

Figure 11:
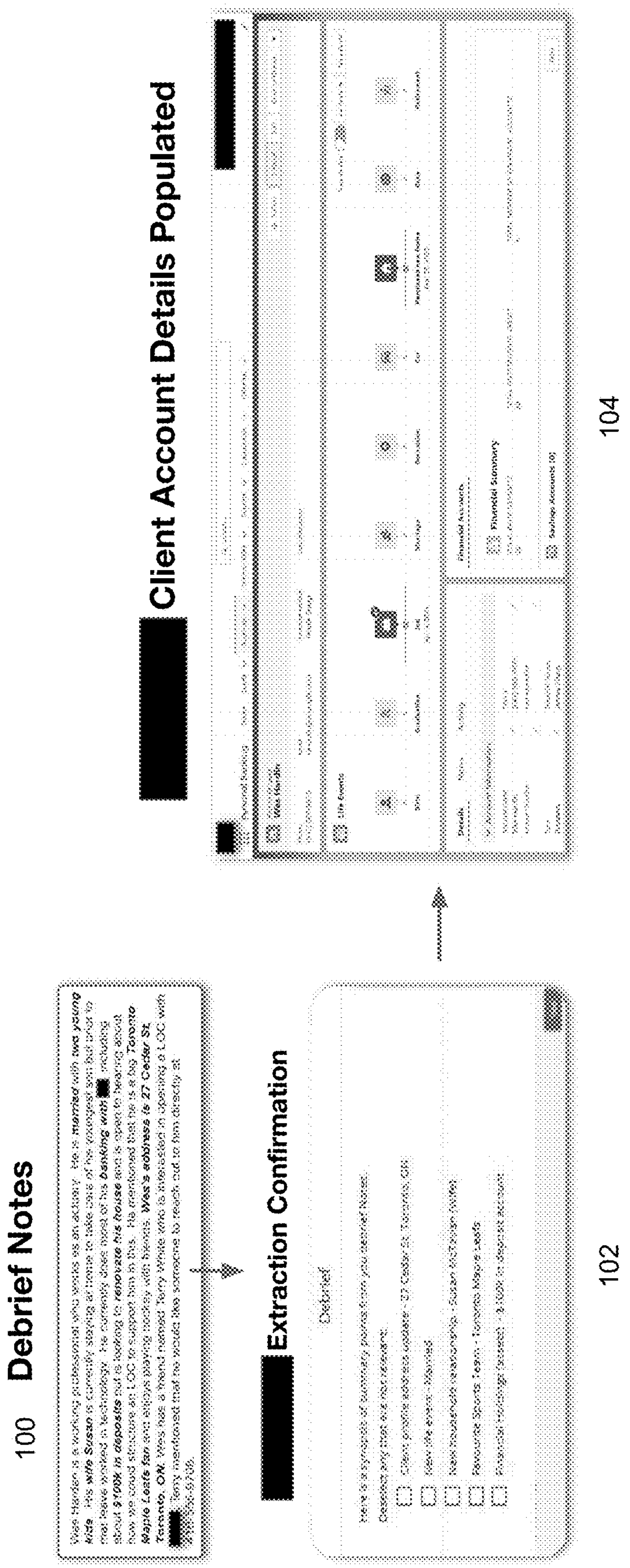
FIG. 11 is a diagram which summarizes the process of conversion of unstructured text into a structured format from the perspective of the user of a CRM software application.

FIG. 11 provides a diagrammatic representation summarizing the conversion process, illustrating the sequence of steps as experienced by the end user at the client computing system. At step 100, the user produces advisory notes, either through typing them into the GUI text input interface or via voice dictation using speech recognition. In this illustration, the transformation of the advisory notes into structured format remains hidden from the user's view. Instead, the user is directly presented with a validation screen at 102, which displays the key/value pairs derived from their notes. The user has the discretion to deselect any irrelevant key/value pairs using checkboxes.

At 104 the selected values are placed in the corresponding fields of a CRM record. In this specific example, a CRM product from Salesforce in California is shown, however the invention is not limited to this particular CRM platform.

Figure 12:
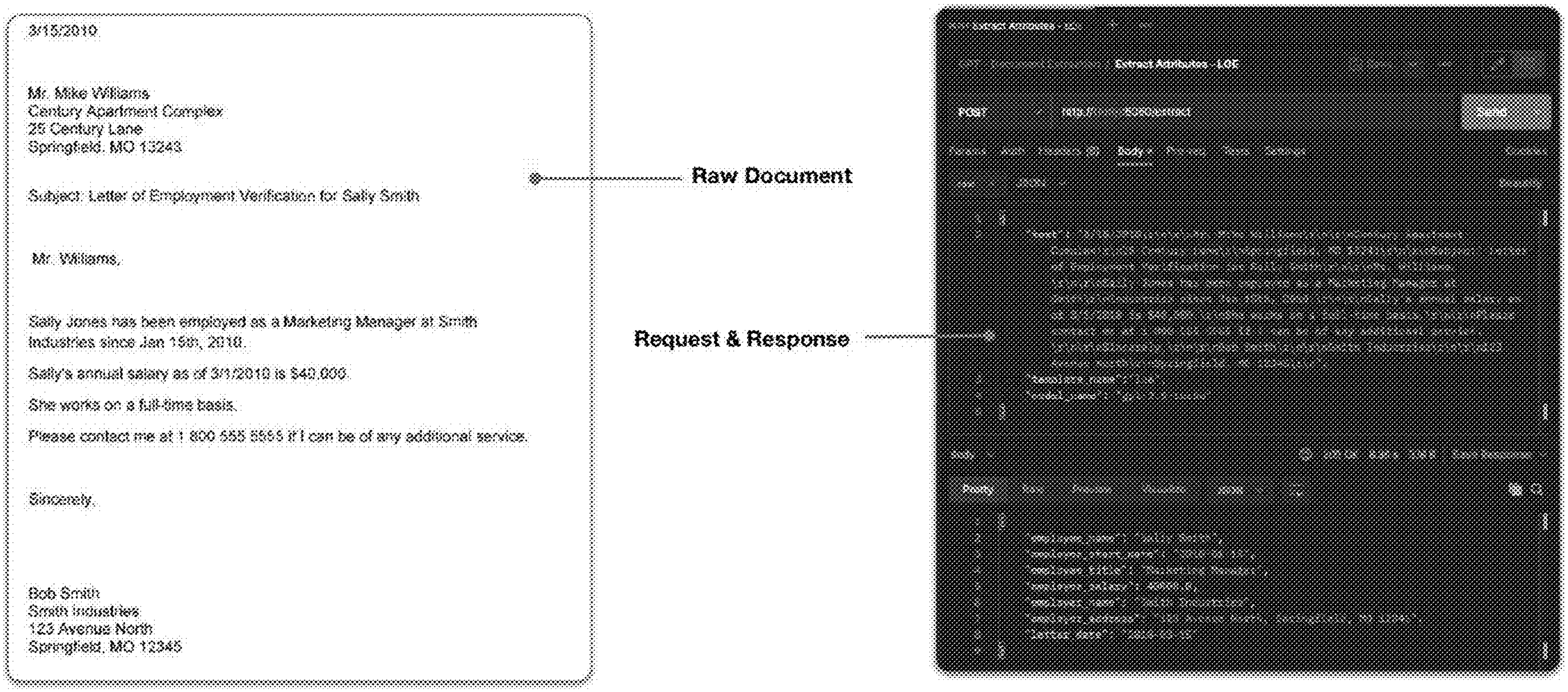
FIG. 12 is a diagram which illustrates another example of application of the invention for converting an employment confirmation letter into structured data which is stored in a CRM record.

Although the invention has primarily been discussed above in the context of the financial sector, its applicability extends beyond this domain. FIG. 12 exemplifies a use case where a user record is populated based on an employment verification letter. In this scenario, the unstructured data, which is the content of an employment confirmation letter, is input in the CRM software application 12 by scanning the letter to generate text, or by other means.

The diagram also illustrates the code snippet showing both the request to the Generative AI service 16 and the subsequent response, which contains the filled-in values. The "text" JSON object encapsulates the unstructured content, followed by the keys and their corresponding extracted values. These keys encompass details such as the employee's name, start date, employee title, salary, as well as the employer's name, address, and the letter's date.

Figure 13:
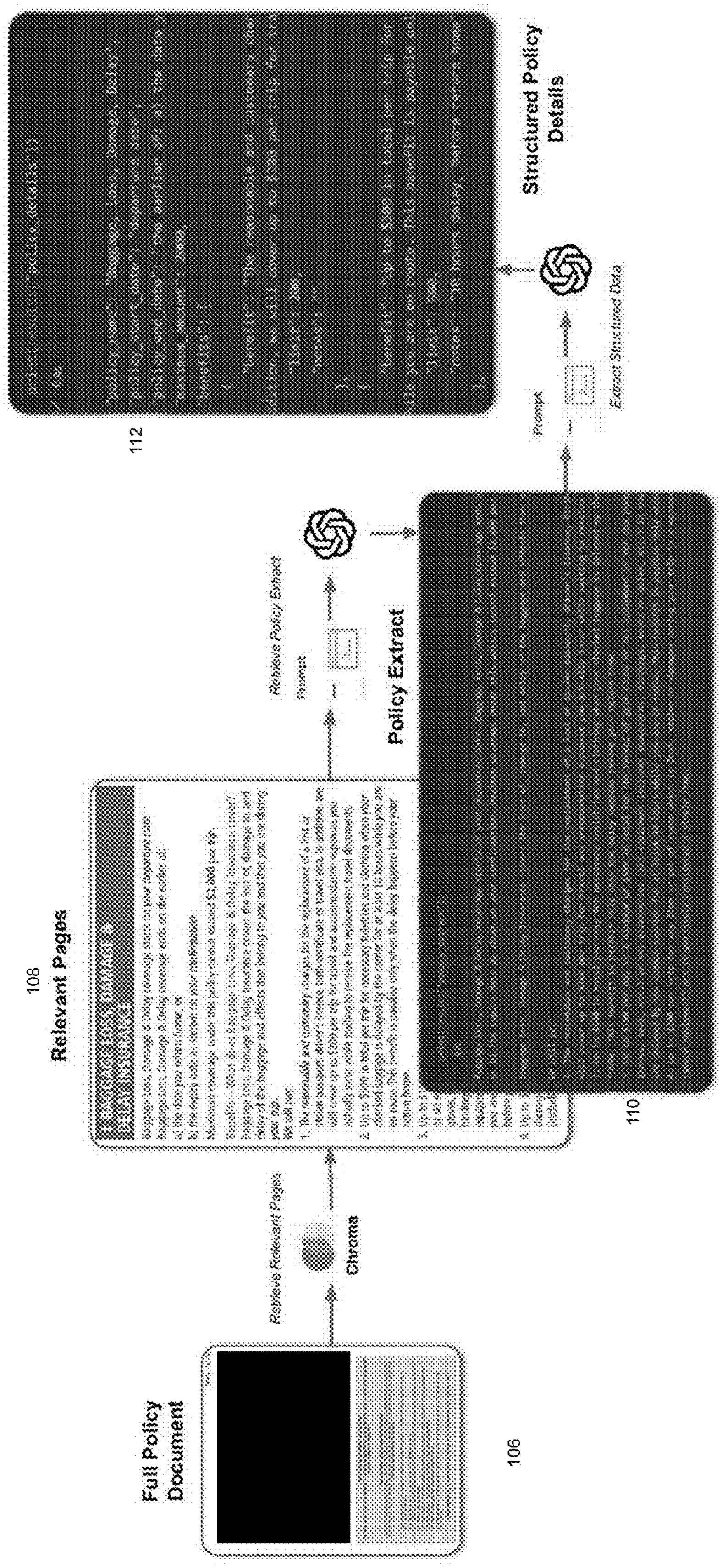
FIGS. 13 and 14 are diagrams which illustrates yet another example of application of the invention for the extraction of coverage details from an insurance policy contract and then storage of the coverage details in a CRM application.
Figure 14:
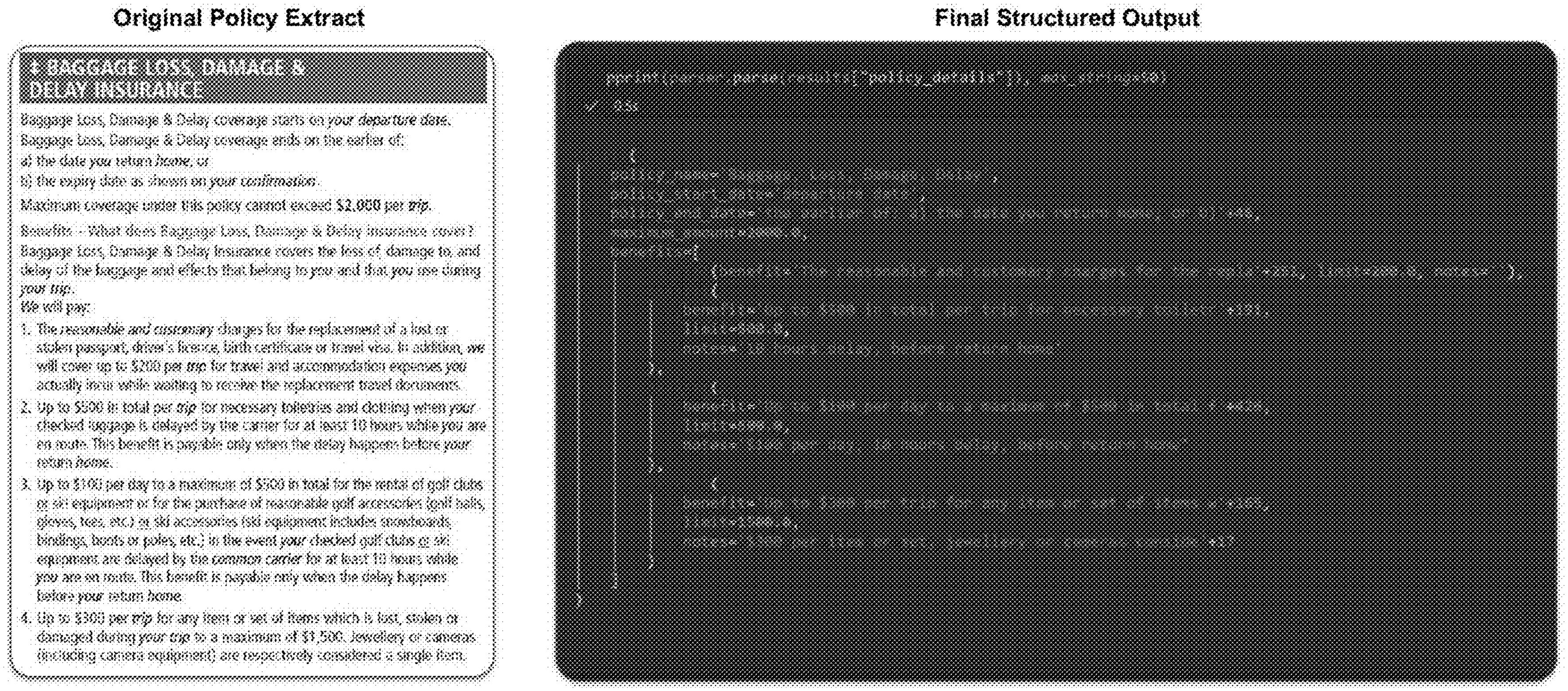

FIGS. 13 and 14 show another application of the invention, specifically in extracting details from insurance policies, such as coverage specifics. In FIG. 13, the process commences with step 106, where a comprehensive insurance policy document is processed to extract the most pertinent pages, denoted as 108. Note that these relevant pages 108 not only convey the unstructured text to be structured but also define a component of the data schema, namely the keys. The JSON data conveying the prompt, as visualized at 110, encapsulates the unstructured text, while the keys are depicted at 112. Transitioning to FIG. 14, the outcome of the Generative AI service is displayed, illustrating the output JSON data with the generated values from the AI operation, juxtaposed alongside their respective keys.

In various embodiments, the methodologies discussed herein are executed by one or more specialized computing devices. These devices might be designed specifically to execute these methods or might encompass digital electronic components like application-specific integrated circuits (ASICs) or field programmable gate arrays (FPGAs) that are consistently programmed to perform the methods. Alternatively, they may consist of general-purpose hardware processors such as CPUs and/or GPUs instructed to perform the techniques according to firmware, memory, other storage solutions, or a mix of these.

The storage solutions can be a random-access memory (RAM) or another type of dynamic or static storage device. This device is responsible for long term storage or short-term storage of data and instructions meant for the processors. The device can also hold temporary data or intermediary details when the processor is executing instructions. When these instructions are retained in storage devices that the processor can access, they transform the computer system into a specialized machine tailored to carry out the operations described in those instructions.

The invention claimed is:

1. A non-transitory computer-readable storage medium storing instructions thereon that, when executed by one or more computers, configure the one or more computers to perform the steps of:

a. receive, at an input of the one or more computers, unstructured data;

b. output, at an interface of the one or more computers, a request to structure the unstructured data by a Generative AI system, wherein the request conveys a data schema that defines how the unstructured data is to be structured;

c. receive, from the interface, structured data as a result of processing by the Generative AI system and storing the structured data in a CRM record maintained by the one or more computers;

wherein the data schema conveys key/value combinations, and each key operates to guide the Generative AI system to identify a value in the unstructured data which corresponds to the key, the data schema mapping placeholders for the values to be generated by the Generative AI system to corresponding keys.

2. The non-transitory computer-readable storage medium as defined in claim 1, wherein the request includes one or more JSON objects.

3. The non-transitory computer-readable storage medium as defined in claim 2, wherein the unstructured data is embedded in a first JSON object.

4. A non-transitory computer-readable storage medium storing instructions thereon that, when executed by one or more computers, configure the one or more computers to perform the steps of:

a. receive, at an input of the one or more computers, unstructured data;

b. output, at an interface of the one or more computers, a request to structure the unstructured data by a Generative AI system, wherein the request conveys a data schema that defines how the unstructured data is to be structured;

c. receive, from the interface, structured data as a result of processing by the Generative AI system and storing the structured data in a CRM record maintained by the one or more computers;

wherein the request includes one or more JSON objects, and wherein the unstructured data is embedded in a first JSON object.

5. The non-transitory computer-readable storage medium as defined in any one of claims 1 and 4, wherein the request is compliant with an XML or YAML format.

6. The non-transitory computer-readable storage medium as defined in claim 5, wherein the request is a JSON computer file.

7. The non-transitory computer-readable storage medium as defined in claim 4, wherein the data schema conveys key/value combinations, wherein each key operates to guide the Generative AI system to identify a value in the unstructured data which corresponds to the key.

8. The non-transitory computer-readable storage medium as defined in claim 7, wherein each key/value combination is embedded in a respective JSON object.

9. The non-transitory computer-readable storage medium as defined in claim 8, wherein each JSON object in which a respective key/value combination is embedded includes a placeholder to receive the value to be generated by the Generative AI system associated with the corresponding key of the key/value combination.

10. A non-transitory computer-readable storage medium storing instructions thereon that, when executed by one or more computers, configure the one or more computers to perform the steps of:

a. receive, at an input of the one or more computers, unstructured data;

b. output, at an interface of the one or more computers, a request to structure the unstructured data by a Generative AI system, wherein the request conveys a data schema that defines how the unstructured data is to be structured;

c. receive, from the interface, structured data as a result of processing by the Generative AI system and storing the structured data in a CRM record maintained by the one or more computers;

wherein the request is compliant with an XML or YAML format, and wherein the request is a JSON computer file.

11. The non-transitory computer-readable storage medium as defined in any one of claims 1, 4 and 10, wherein the input is implemented by a GUI.

12. The non-transitory computer-readable storage medium as defined in claim 11, wherein the GUI includes a control element.

13. The non-transitory computer-readable storage medium as defined in claim 12, wherein the unstructured data includes text, the control element being configured to capture a text input from a user.

14. The non-transitory computer-readable storage medium as defined in any one of claims 1, 4 and 10, wherein the request conveys the unstructured data, which includes text.

* * * * *